(12) United States Patent
Bourekas

(10) Patent No.: US 6,598,050 B1
(45) Date of Patent: Jul. 22, 2003

(54) APPARATUS AND METHOD FOR LIMITED DATA SHARING IN A MULTI-TASKING SYSTEM

(75) Inventor: Philip A. Bourekas, San Jose, CA (US)

(73) Assignee: Integrated Device Technology, Inc., Santa Clara, CA (US)

(*) Notice: Subject to any disclaimer, the term of this patent is extended or adjusted under 35 U.S.C. 154(b) by 0 days.

(21) Appl. No.: 09/503,008

(22) Filed: Feb. 11, 2000

(51) Int. Cl.[7] .............................................. G06F 17/30
(52) U.S. Cl. ...................................... 707/100; 711/203
(58) Field of Search ...................... 707/7, 100; 711/203

(56) References Cited

U.S. PATENT DOCUMENTS

| | | | |
|---|---|---|---|
| 5,197,138 A | 3/1993 | Hobbs et al. ................ | 712/222 |
| 5,317,711 A | 5/1994 | Bourekas et al. .............. | 714/47 |
| 5,465,337 A * | 11/1995 | Kong .......................... | 711/207 |
| 5,553,268 A | 9/1996 | Willenz et al. .............. | 711/158 |
| 5,574,877 A * | 11/1996 | Dixit et al. .................. | 711/207 |
| 5,636,363 A | 6/1997 | Bourekas et al. ............ | 711/138 |
| 5,899,994 A | 5/1999 | Mohamed et al. ........... | 707/100 |
| 5,956,756 A * | 9/1999 | Khalidi et al. ............... | 711/207 |
| 6,038,661 A | 3/2000 | Yoshioka et al. ............ | 712/244 |
| 6,073,226 A * | 6/2000 | Cutshall et al. .............. | 711/203 |
| 6,079,004 A * | 6/2000 | Liedtke ....................... | 711/207 |
| 6,425,039 B2 | 7/2002 | Yoshioka et al. ........... | 710/269 |

* cited by examiner

Primary Examiner—John Breene
Assistant Examiner—Cheryl Lewis
(74) Attorney, Agent, or Firm—Skjerven, Morrill, LLP

(57) ABSTRACT

An enhanced translation lookaside buffer (TLB), which translates a virtual address into a physical address, permits sharing of data or programs among a subset of all tasks through the use of a group membership field. Each entry in the TLB includes a global bit indicating that all tasks should have access to the translation, an address space identifier identifying an individual task that should have access to the translation and a group membership field identifying a group of tasks that have access to the entry, wherein the group of tasks is a subset of all tasks. The virtual address also has a group membership field that is compared with a group membership field in the TLB entry. If the two group membership fields match, the current task is permitted to use the translation. Thus, a given translation within the TLB may be valid for all tasks, only an individual task, or a group of tasks.

16 Claims, 4 Drawing Sheets

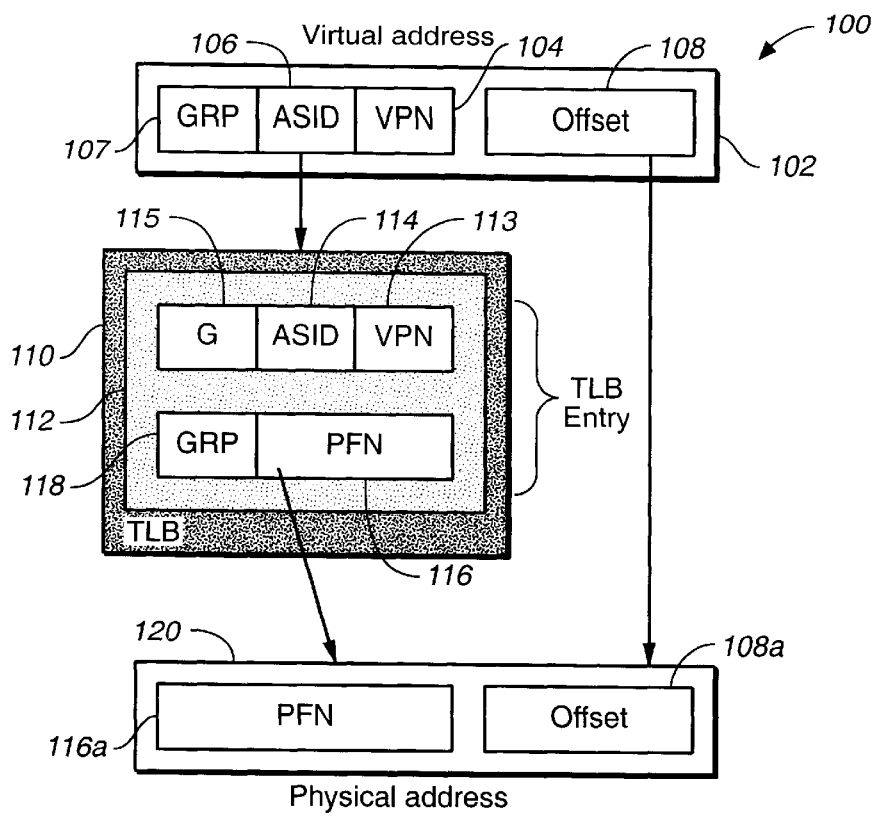
FIG._1
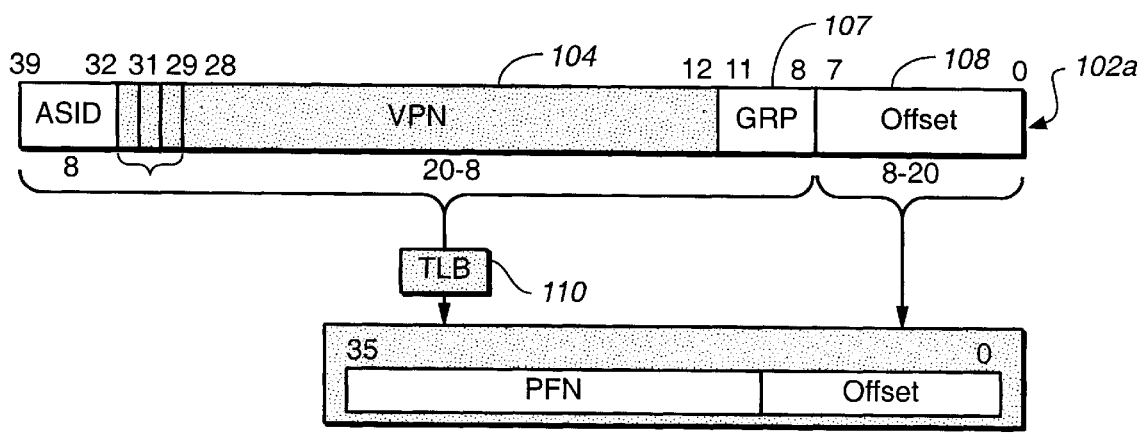
FIG._2

Group    150
         Entry #

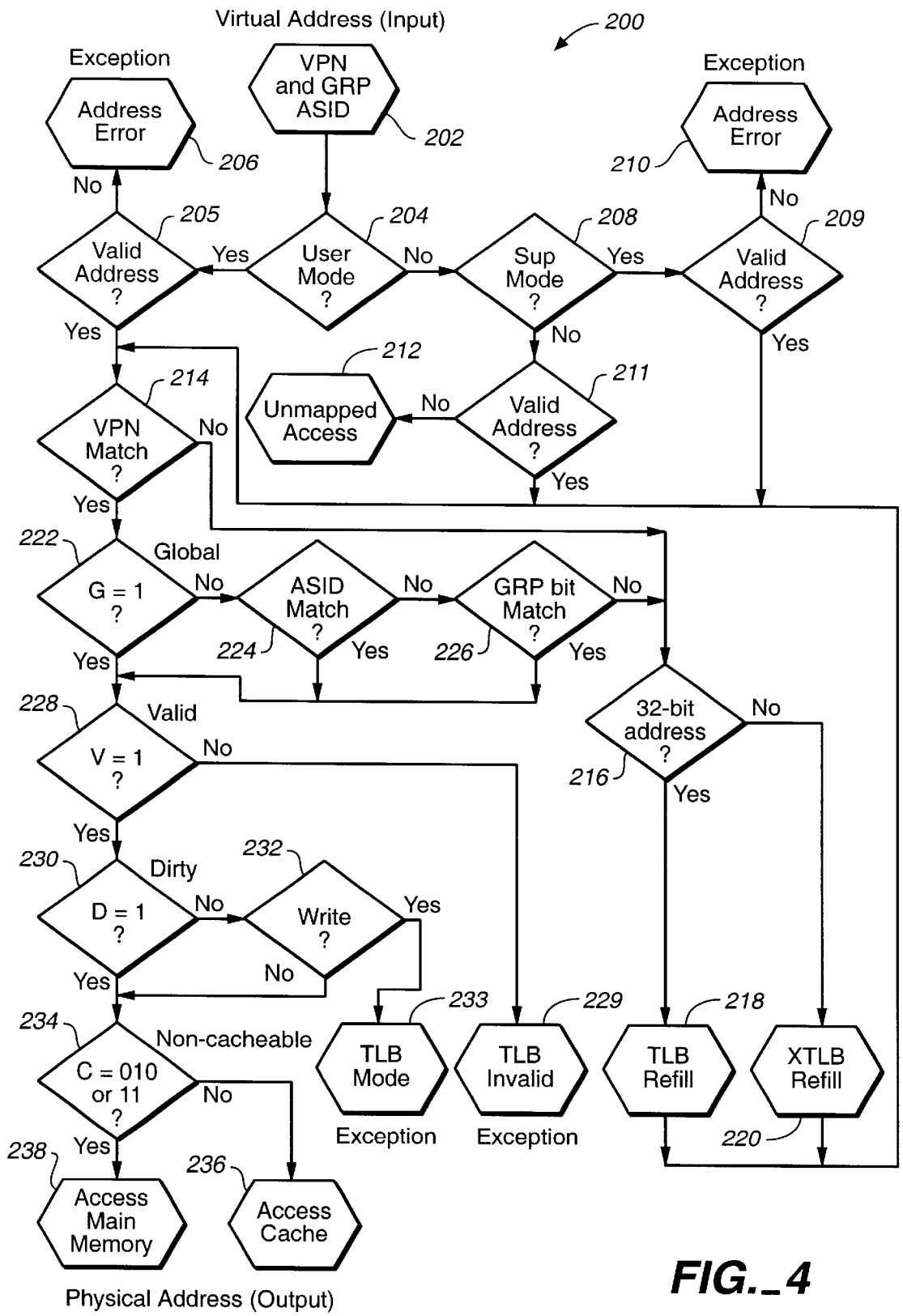
FIG._4

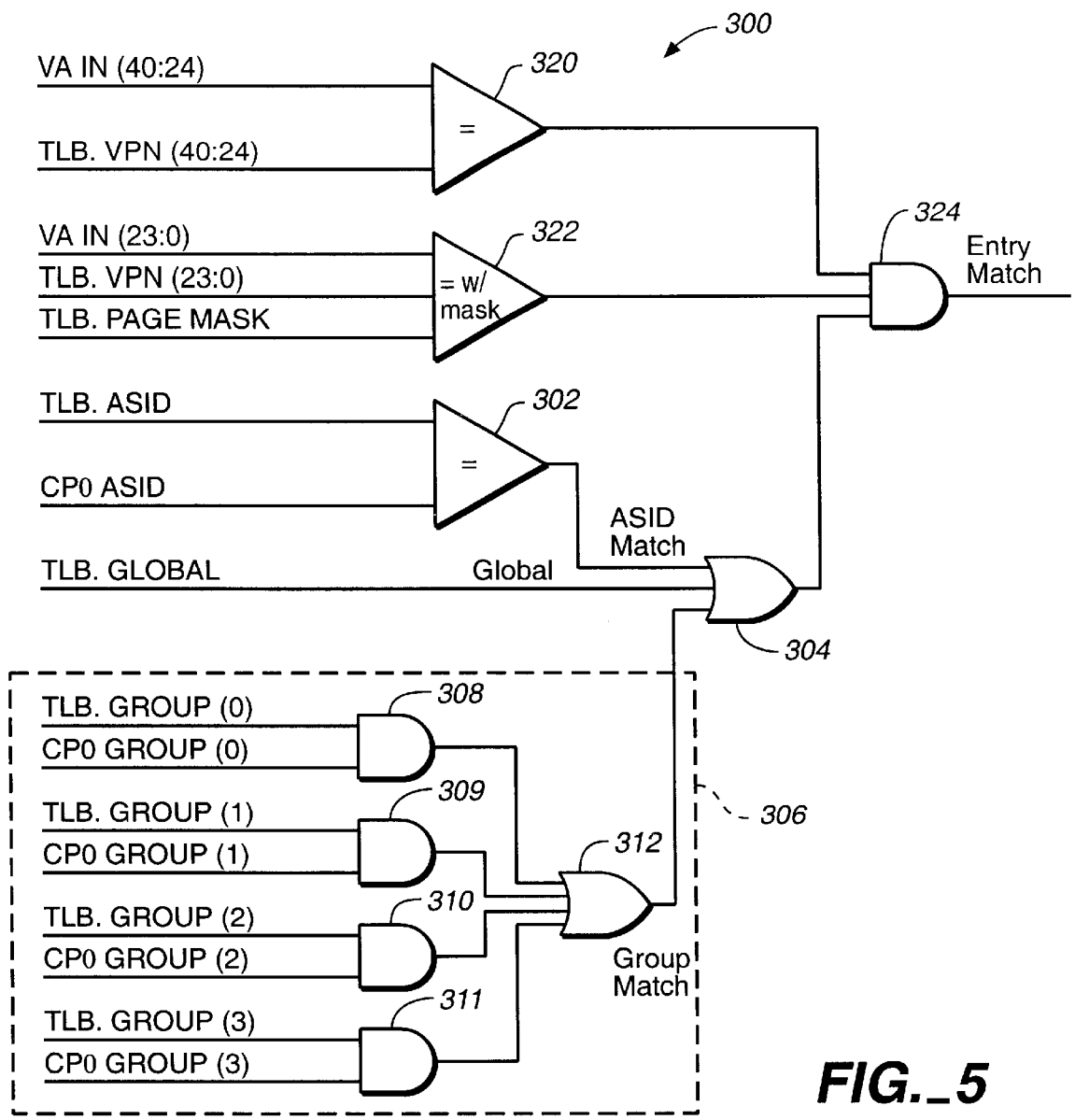
FIG._5

APPARATUS AND METHOD FOR LIMITED DATA SHARING IN A MULTI-TASKING SYSTEM

FIELD OF THE INVENTION

The present invention relates to a microprocessor based electronic system and in particular to a virtual addressing scheme within a microprocessor based electronic system.

BACKGROUND

The use of virtual addressing in computer architecture is well known in the art. Virtual addressing allows a single program to operate independently of the actual resources of a system and independently of any other programs which may also be executing in the system.

With virtual addressing, a program uses addresses for instructions and data that do not necessarily correspond to the physical resources within a system that contains that information. The operating system and CPU then collaborate to translate these virtual addresses into the correct physical locations within a system, performing this translation dynamically.

Under this arrangement, the operating system determines the appropriate translation for a given task. By setting the translation on a per task basis, multiple tasks can use identical virtual addresses, but separate physical memory. Such a system allows tasks to be developed and initiated independently of each other, increasing system reliability and flexibility.

Similarly, using a "virtual memory system," the operating system can select which portions of which tasks are actually resident in system RAM, reducing the amount of actual memory the system must contain.

The process for managing the translation of virtual addresses to physical addresses is commonly called "memory management." Commonly, a structure referred to as a "translation lookaside buffer," or "TLB," is used as a cache of recent translations to allow the process to occur at full processor execution rates.

Although there are separate aspects to the various programs in a multi-tasking system, there are often portions of the task that are common to other tasks. For example, the subroutine "printf", which prints a string of characters to an I/O terminal, would typically be common to all tasks in a system. Similarly, there may be data areas common to multiple tasks in a system.

To support this operation, a typical memory management unit provides two modes of translation. In a first mode, a translation is available only to one particular task in the system. In the second mode, a given translation may be available to all tasks in the system, i.e., it is considered a "global translation."

Sometimes in a multi-tasking system, however, it is desirable for some, but not all, tasks to share the same programs and/or data. For example, a router may have a master route table to which certain processes within the system should have access. For example, some processes require access to the route table to look up the proper route for a given packet and other processes are used to up-date the route table. However, it may be undesirable for other tasks in the system to inadvertently access the route table data structure as that may corrupt the contents of the data structure or violate a system security rule.

Conventionally, when a multi-tasking system shares translations among a specific subset of tasks, operating system "traps" are used. An operating system trap is a software subroutine, invoked by a system task, which provides a specific operating system service to the calling program. Thus, if a given system needs to share data among a specific set of tasks, the operating system can implement a subroutine that checks for access privilege and then performs the access as requested. In effect, the shared information is made directly accessible only to the operating system.

Unfortunately, the use of an operating system trap causes a significant loss of performance. When a trap occurs, the operating system must decode the reason for the trap, store the current state of the system for context preservation, perform the desired function, reinstate the current state of the system and resume operations. Consequently, the overhead for a single operating system trap can be in the order of micro-seconds, as a few dozen instructions are required.

SUMMARY

A translation lookaside buffer (TLB), in accordance with an embodiment of the present invention, permits the sharing of data and/or programs among a subset of all tasks through the use of a group membership field. The TLB includes a plurality of entries, each of which includes at least a virtual page number and a group membership field that identifies a group of tasks that may utilize a respective translation, wherein the group of tasks is a subset of all tasks. The virtual address also has a group membership field that is compared with the group membership field in the TLB entry. The group membership field may include a number of bits, e.g., four bits. Each bit in the group membership field may indicate a different group. A translation is considered valid for a current task when corresponding bits in the group membership field in the virtual address and in the translation, i.e., in the TLB, are set. Thus, it is not necessarily required that the entire membership field match, but that a single bit within the field matches in the current task and the translation. In other embodiments, any number of bits within the group membership field may be required to match in both the current task and the translation. If there is a group membership match, the current task is permitted to utilize the translation. Each TLB entry may further include a global bit and an address space identifier. Thus, a given translation within the TLB may be valid for all tasks, only an individual task, or a group of tasks. If the translation may be used by the current task, a virtual page number, which is also included in the virtual address, is translated into a page frame number. The page frame number is then concatenated with an offset from the virtual address to form the physical address.

In accordance with another embodiment of the present invention, a method of translating a virtual address from a current task to a physical address includes issuing a virtual address from a current task to a TLB, the virtual address having at least a virtual page number. The virtual page number is compared to at least one TLB virtual page number to find a desired translation. It is then determined whether the current task is a member of a group of tasks that has access to the translation, the group including less than all tasks. This is accomplished, for example, by comparing the group membership field in the virtual address to the group membership field in the desired translation entry. If the current task does belong to a group that has access to the translation, the virtual page number is translated to a page frame number. The page frame number will then be concatenated with an offset in the virtual address to form the physical address.

With the use of a group membership field, a group of tasks, as opposed to all tasks or merely individual tasks, may be marked for access to a given translation. Accordingly, the task is not required to initiate an operating system trap to access shared data. Consequently, there is no performance degradation associated with operating system traps for accessing shared data. Further, the group membership field enables both limited sharing as well as system security and reliability.

BRIEF DESCRIPTION OF THE DRAWINGS

FIG. 1 shows a block diagram showing the translation of a virtual address to a physical address by a translation lookaside buffer using a group membership field in accordance with the present invention.

FIG. 2 shows the virtual to physical address translation of a 32 bit virtual address.

FIG. 3 shows a translation lookaside buffer that implicitly indicates group membership by the location of the TLB entry.

FIG. 4 shows a flow chart of the virtual to physical translation process in accordance with the present invention.

FIG. 5 is a schematic diagram of a circuit used to implement an embodiment of the present invention.

DETAILED DESCRIPTION

FIG. 1 is a block diagram 100 showing the translation of a virtual address 102 to a physical address 120 by a translation lookaside buffer (the TLB) 110, which includes a number of entries, but for the sake of simplicity is shown with a single entry 112. In accordance with the present invention, the TLB 110 determines whether the current task should utilize a translation by examining not only an address space identifier and a global bit, but a group membership field as well. Thus, the current task may have access to a translation on a global or individual basis, as well as by being a member of a group of less than all the tasks.

During operation, a current task issues a virtual address 102 to execute an instruction or data reference. The virtual address 102, as shown in FIG. 1, includes several different fields including a virtual page number (VPN) 104, which includes high order virtual address bits issued by the program, and an address space identifier (ASID) 106, which is the task number associated with the current task. The virtual address 102 also includes a field for group membership (GRP) 107. The group membership field 107 is used to identify the group to which the current task belongs. The address space identifier and the group membership field 107 for the current task are stored, e.g., in a register in the system control coprocessor. The virtual address 102 also includes the offset 108, which represents a specific location within the page, as well as other information (not shown), such as whether a read or write operation is requested, whether an instruction or data is requested and other such information well known in the art.

It should be understood that the group membership field 107 and address space identifier 106 may be combined in one field, e.g., the group membership field 107 is a subset of the address space identifier 106, or they may be located in separate fields. For the sake of clarity, however, the present disclosure will discuss group membership 107 as separate from address space identifier 106. In another embodiment, the group membership field 107 is a subset of the virtual page number 104.

The TLB 110 translates the virtual address 102 into a physical address 120. The virtual page number 104, address space identifier 106 and the group membership field 107 from the virtual address 102 are transmitted to the TLB 110 for translation, along with any other necessary information. Translation lookaside buffers are in general well known by those of ordinary skill in the art. For more information relating to general operation of TLBs, see U.S. Pat. Nos. 5,649,232 and 5,564,052, both of which are incorporated herein by reference.

The TLB 110 is a fully associative memory that holds multiple entries, e.g., 64 entries. Each entry contains a pair of translations for adjacent virtual address pages. For the sake of clarity, however, only one half of one entry, i.e., one translation, is shown as element 112 in FIG. 1. The TLB 110 is similar to a cache of recent virtual to physical address translations. When a program issues a virtual address 102 for translation, each TLB 110 entry is examined simultaneously for a match with the virtual address 102. If no match occurs, an exception is signaled, allowing the CPU to update the TLB 110 (typically done by using translations stored in memory).

As shown in FIG. 1, the TLB entry 112 includes fields for at least a TLB virtual page number 113, a TLB address space identifier 114, a global bit (G) 115, and a page frame number (PFN) 116. In addition, the TLB entry 112 includes a TLB group membership field 118. The TLB virtual page number 113 and the TLB address space identifier 114 are compared to the virtual page number 104 and address space identifier 106 from the virtual address 102. The TLB group membership field 118 is compared to the group membership field 107 from the virtual address 102 to determine if the task issuing the virtual address 102 is part of a group that has access to the translation. The global bit 115 is used to indicate that all tasks have access to the translation. The page frame number 116 represents the upper bits of the physical address. It should be understood that the TLB entry 112 may include other bits as well, such as control bits used indicate if the entry is valid, is dirty (i.e., writable), or cacheable.

In operation, the TLB 110 translates virtual address 102 into a physical address 120, as shown in FIG. 1, by outputting the page frame number 116, which is then concatenated with the offset 108 from the virtual address 102. Thus, the physical address 120 includes an offset 108a, which is the same as offset 108 from the virtual address 102, and a page frame number 116a, which is the same as the page frame number 116 from the TLB entry 112. In one embodiment, the offset 108 does not pass through the TLB 110.

To make a translation, the TLB 110 compares the virtual page number 104 with the TLB virtual page number 113 in each the TLB entry. This may be done simultaneously across all TLB entries. If a TLB entry, e.g., the TLB entry 112, contains a matching virtual page number, the TLB 110 examines the global bit 115 in the matching TLB entry 112 to determine if every task can use this translation. If the translation is not global, the TLB 110 checks to see if the address space identifier 106 matches the TLB address space identifier 114 to determine if the current task should use this translation. Thus, similar to a conventional translation lookaside buffer, the TLB 110 determines whether the current task may use the translation based on a global and an individual status.

In accordance with an embodiment of the present invention, the TLB 110 also determines if the current task may use the translation by matching the TLB group membership field 118 and the group membership field 107 in the virtual address 102. In one embodiment, membership is indicated by a single bit within the group membership field 118, where the group membership field 118 may include a plurality of bits, e.g., four bits. Membership is identified when a bit is set for both the current task and for the translation. Thus, for example, if the same corresponding bit within the TLB group membership field 118 and the group membership field 107 are set to "1" a match is said to occur. Advantageously, with the use of group membership fields 107 and 118, a group of tasks, as opposed to all tasks or merely individual tasks, may be marked for access to a given translation. If desired, membership might be indicated in some embodiments using different bits or a particular number of bits with the group membership field.

FIG. 2 shows the virtual to physical address translation of a 32 bit virtual address. As shown in FIG. 2, different virtual address 102a may have different page sizes, i.e., offset 108 may be, e.g., between 8 and 20 bits and virtual page number (VPN) 104 may be, e.g., between 20 and 8 bits. Of course, any number of bits may be used if desired. The TLB 110 may translate virtual address 102a regardless of page size into a physical address 120. As shown in FIG. 2, the group membership field 107 may have a plurality of bits, e.g., 4 bits. Each bit within the group membership field 107 may represent a different group membership, for example, by setting the bit to one. If a corresponding bit in the group membership field 118 (shown in FIG. 1) is likewise set to one, then the TLB entry 112 is a valid translation for the current task and any other task which belongs to that group. The group memberships of a task is indicated in a register within the CPU. Group membership bits are also added to the memory data structures and CPU registers that are to be used to load the TLB. 110 with valid translations. A given translation may be available to multiple groups and a given task may belong to multiple groups.

It should be understood that while virtual address 102a is shown in FIG. 2 as having 32 bits, any desired number of bits may be used, e.g., 64 bits or more. Moreover, it should be understood that the virtual address may contain additional information. For example, bits 29, 30 and 31 in virtual address 102a may be used to select user, supervisor, or kernel address modes. However, the selection of user, supervisor, or kernel address spaces is unrelated to the present invention, but is well understood by those of ordinary skill and, thus, need not be explained in greater detail.

If desired, group membership may be designated in other but similar ways. For example, rather than interpreting the bits of group membership field 107 individually, a processor can view the bits as a single group number. Thus, a four bit group membership field may signify 16 different groups ($2^4$=16). The group membership could also be denoted as high-order address bits in the virtual page number 104 or through interpretations or extensions to the space address identifier 106 number.

In another embodiment, as shown in FIG. 3, selected areas of a TLB 150 may be used to implicitly indicate group membership. The TLB 150 is shown with 16 entries which are divided into four different group memberships A, B, C, and D, as shown in FIG. 3. Of course, the TLB 150 may have as many table entries as desired, which may be divided into as many groups as desired. Any translation that belongs to group membership A, for example, will be physically stored in the TLB 150 in the area designated as group A. The group membership of the current task would then only need to be described in a CPU register.

With the use of a group membership field, the operating system can support three levels of access in a virtual to physical address translation. The operating system permits a global translation, an individual translation and a group translation. Accordingly, the program is not required to initiate an operating system trap during an operation to shared or protected resources. Consequently, there is no performance degradation associated with operating system traps caused by shared data accesses. Further, the group membership field enables both limited sharing as well as system security and reliability.

FIG. 4 shows a flow chart of the virtual to physical translation process 200 in accordance with the present invention. In step 202, the TLB 110 receives as input at least part of the virtual address 102, including the virtual page number 104, the address space identifier 106 and the group membership field 107. Different modes of operation, e.g., user mode, supervisor mode, and kernel mode, may use different virtual address spaces. The mode of operation may be determined from, e.g., bits in the virtual page number as described above in reference to FIG. 2 or from bits in a CPU control register. Depending on the mode of operation, i.e., user (step 204), supervisor (step 208), or kernel, the TLB 110 determines if the virtual address is valid and should be translated by the TLB (steps 205, 209, and 211, respectively).

The validity of an address is determined by its conformance to rules in effect for the processor. For example, an address is valid if it resides within a range whose access is allowed for the current operating mode. For example, user mode tasks are not allowed to access addresses considered to be kernel only and an attempt to do so is considered "invalid." Similarly, an address is valid if it corresponds to the alignment rules for the type of data being accessed, e.g., instructions must be aligned on word boundaries. Attempts to read an instruction from an odd byte address are considered invalid addresses.

If the virtual address is valid the process continues. However, if the virtual address is not valid, there is an address error in the user mode and the supervisor mode and an exception occurs (steps 206 and 210, respectively), while in the kernel mode there is unmapped access (step 212). An "unmapped address" is an address whose translation is not determined by the TLB, but rather by a fixed virtual to physical translation rule.

If the virtual address is valid, the TLB 110 compares the virtual page number 104 in the virtual address 102 with the TLB virtual page number in each TLB entry in step 214. As discussed above, each of the TLB entries may be checked simultaneously for a TLB virtual page number that matches the virtual page number 104. If no match occurs, a TLB miss exception occurs and the software conventionally updates the TLB 110 from a page table of virtual/physical addresses in memory so that a translation can occur. The width of the virtual address 102 may vary. Thus, the TLB 110 determines the width of the virtual address 102, e.g., 32 bits or 64 bits, in step 216. If the virtual address 102 is, e.g., 32 bits wide, the software performs a TLB refill step in step 218. If the virtual address 102 is larger, e.g., 64 bits wide, an extended TLB refill is performed at step 220. Software can then update the TLB to contain an appropriate translation. The process then flows back to step 214 to determine if the virtual page number 104 in the virtual address 102 matches any of the TLB virtual page number in the new entries.

If in step 214 the virtual page number 104 of the virtual address 102 does match the TLB virtual page number in a TLB entry, e.g., TLB virtual page number 113 in TLB entry 112, the TLB 110 then checks to see if the global bit 115 is set (step 222) to indicate that all tasks are to utilize this translation. If the global bit 115 is not set, the TLB 110 compares the address space identifier 106 to the TLB address space identifier 114 to determine if there is a match (step 224), which would indicate that the particular task that issued the virtual address 102 may use the translation.

If there is not an address space identifier match, the TLB 110 compares the group membership 107 to the TLB group membership 118 to determine if the current task falls within a group that may use the translation (step 226). If the current task does not belong to a group that may use the translation, e.g., group membership 107 does not match the TLB group membership 118, a TLB miss exception occurs and the process flows to step 216.

If the global bit is set, there is an address space identifier match, or there is a group membership match, the TLB 110 retrieves access control bits, e.g., valid (V), dirty (D), and coherency (C), from the matching TLB entry. The process flows to step 228 to determine whether the TLB entry is marked as valid. If the TLB entry is not valid a TLB invalid exception occurs as shown in step 229. It should be understood that while flow chart 200 shows a sequential determination of an address match (step 214) and whether the translation is global (step 222), or if there is an address space identifier match (step 224) or if there is a group bit match (step 226) and whether the address is valid (step 228), these steps may occur approximately simultaneously.

If the TLB entry is valid, the TLB 110 then determines at step 230 if the page is marked as dirty, and therefore writable. If the page is marked as not dirty, the TLB 110 then determines at step 232 if the current task is to write at the address. If the current task is to write a TLB modification, an exception occurs at step 233. However, if the page is marked as dirty (step 230) or if the page is not dirty, but no writing is to occur (step 232), the TLB 110 determines whether references to the page are non-cacheable in step 234. If cacheable, the physical memory, including the PFN 116a and the offset 108a is cached at step 236 and if not, then main memory is accessed at step 238.

FIG. 5 is a schematic diagram of the circuit 300 used to implement an embodiment of the present invention and shows that the matching of the address and whether the translation is valid occurs approximately simultaneously. As shown in FIG. 5, circuit 300 includes a comparison circuit 302 which compares bits in the address space identifier 106 on line CP0.ASID with the bits in the TLB address space identifier 114 on line TLB.ASID to determine if there is an address space identifier match. The comparison circuit 302 produces a high output signal that is received by logic OR gate 304 if there is an address identifier match or a low output signal if there is not a match. Logic OR gate 304 also receives the global bit 115 on line TLB.GLOBAL.

Comparison circuits are well known by those of ordinary skill in the art. For example, comparison circuit 302 may use a plurality of exclusive OR gates, each comparing a bit from the address space identifier 106 with a corresponding bit in the TLB address space identifier 114.

As shown in FIG. 5, a group match circuit 306 includes a number of logic AND gates 308, 309, 310, and 311 each receiving a respective group membership bit from group membership field 107 and the TLB group membership field 118. Thus, for example, logic AND gate 308 receives a first bit from the from the TLB group membership field 118 on line TLB.GROUP(0) and the group membership field 107 from a register within the CPU on line CP0.GROUP(0). The output terminal of each logic AND gate 308–311 is coupled to the input terminals of a logic OR gate 312. Thus, if any of the group membership bits match, the appropriate logic AND gate will produce a high output signal which will cause the logic OR gate 312 to produce a high output signal. The output terminal of the logic OR gate 312 is coupled to the input terminal of logic OR gate 304.

Thus, if comparison circuit 302 produces a high output signal, indicating an address space identifier match, the global bit on line TLB.GLOBAL is high, indicating a global designation, or if the group match circuit 306 produces a high output signal, indicating a group membership match, logic OR gate 304 will produce a high output signal.

In addition, circuit 300 includes a comparison circuit 320 that compares, e.g., bits [40:24] from the virtual page number 104 on line VA.IN(40:24) to the corresponding bits in virtual page number 113 in the TLB 110 on line TLB.VPN (40:24). Another comparison circuit 322 compares, e.g., bits [23:0] from the virtual page number 104 on line VA.IN(23:0) to the corresponding bits in virtual page number 113 in the TLB 110 on line TLB.VPN(23:0) and a TLB page mask on line TLB.PAGEMASK, which is used to indicate how many bits are compared. The respective output terminals of comparison circuits 320, 322 and the logic OR gate 304 are received by a logic AND gate 324, which produces a signal indicating whether there is an entry match.

While the present invention has been described in connection with specific embodiments, one of ordinary skill in the art will recognize that various substitutions, modifications and combinations of the embodiments may be made after having reviewed the present disclosure. The specific embodiments described above are illustrative only. Various adaptations and modifications may be made without departing from the scope of the invention. For example, the TLB structure may be replaced with a "microTLB" which is a smaller TLB-like structure with fewer entries and higher speed, refilled from any on-chip TLB as described here. Other embodiments and modifications may be made by those of ordinary skill in the art. Thus, the spirit and scope of the appended claims should not be limited to the foregoing description.

What is claimed is:

1. A method of translating a virtual address to a physical address, said method comprising:

issuing a virtual address from a current task to a translation lookaside buffer, said virtual address having at least a virtual page number;

comparing said virtual page number to at least one translation lookaside buffer (TLB) virtual page number to find a desired translation;

determining whether said current task is a member of a group of tasks that has access to said translation, said group including less than all tasks; and translating said virtual page number to a page frame number and outputting said page frame number if said current task belongs to a group that may use said translation.

2. The method of claim 1, wherein said virtual address further includes a group membership field having at least one bit wherein determining whether said current task belongs to a group comprises comparing said at least one bit in said group membership fields with at least one bit in a TLB group membership field in said desired translation.

3. The method of claim 1, wherein said virtual address further includes an address space identifier, said method further comprising comparing said address space identifier with a TLB address space identifier in said desired translation to determine if said current task may use said translation.

4. The method of claim 1, said method further comprising checking to see if all tasks may use said translation.

5. The method of claim 1, wherein said virtual address further includes an offset representing an address in page frame space, said method further comprising concatenating said page frame number with said offset to produce a physical address.

6. An apparatus comprising:
a translation lookaside buffer (TLB) for translating a virtual address into a physical address, said TLB having a plurality of entries, each of said entries including at least a virtual page number and a TLB group membership field, said TLB group membership field identifying a group of tasks that have access to a respective entry, wherein each task is an independent program or subprogram and wherein said group of tasks may be a subset of all tasks.

7. The apparatus of claim 6, wherein said TLB group membership field includes a plurality of bits, each of said bits representing a different group.

8. An apparatus comprising:
a translation lookaside buffer (TLB) for translating a virtual address into a physical address, said TLB having a plurality of entries, each of said entries including at least a virtual page number and a TLB group membership field, said TLB group membership field identifying a group of tasks that have access to a respective entry, wherein said group of tasks may be a subset of all tasks;
wherein said virtual address comprises a desired virtual page number that is compared to said virtual page number in at least one of said entries and said virtual address further comprises a virtual address group membership field having at least one bit, said TLB group membership field having at least one bit, said virtual address group membership field is compared to said TLB group membership field in at least one of said entries.

9. The apparatus of claim 8, wherein each of said entries further comprises an address space identifier and a global bit and said virtual address further comprises a desired address space identifier.

10. An apparatus comprising:
a means for translating a virtual address into a physical address, said means for translating comprising a means for determining if a task issuing a virtual address belongs to a group of tasks that may use a translation, wherein said group of tasks is a subset of all tasks, wherein each task is an independent program or subprogram.

11. The apparatus of claim 10, wherein said means for translating is a translation lookaside buffer.

12. The apparatus of claim 11, wherein said translation lookaside buffer has multiple translation entries and has different areas of storage for said entries, wherein said means for determining if a task issuing a virtual address belongs to a group of tasks that may use a translation is the selected area that an entry is stored in said translation lookaside buffer.

13. The apparatus of claim 10, said means for translating further comprising a means for determining if all tasks are to have access to said translation and a means for determining if only said task issuing said virtual address may use said translation.

14. The apparatus of claim 10, wherein said means for determining if a task issuing a virtual address belongs to a group of tasks that may use a translation is a group membership field within said virtual address.

15. The apparatus of claim 14, wherein said virtual address further includes an address identifier space, wherein said group membership field is a subset of said address identifier space.

16. The apparatus of claim 14, wherein said virtual address further includes a virtual page number, wherein said group membership field is a subset of said virtual page number.

* * * * *